US010128492B2

(12) United States Patent
Hayashi et al.

(10) Patent No.: US 10,128,492 B2
(45) Date of Patent: Nov. 13, 2018

(54) POSITIVE ELECTRODE FOR ALKALINE STORAGE BATTERIES AND ALKALINE STORAGE BATTERY

(71) Applicant: PANASONIC INTELLECTUAL PROPERTY MANAGEMENT CO., LTD., Osaka (JP)

(72) Inventors: Kiyoshi Hayashi, Osaka (JP); Yasushi Nakamura, Osaka (JP); Fumio Kato, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 210 days.

(21) Appl. No.: 15/033,056

(22) PCT Filed: Dec. 4, 2014

(86) PCT No.: PCT/JP2014/006060
§ 371 (c)(1),
(2) Date: Apr. 28, 2016

(87) PCT Pub. No.: WO2015/087519
PCT Pub. Date: Jun. 18, 2015

(65) Prior Publication Data
US 2016/0254534 A1 Sep. 1, 2016

(30) Foreign Application Priority Data
Dec. 10, 2013 (JP) .................................. 2013-255194

(51) Int. Cl.
*H01M 4/32* (2006.01)
*H01M 4/38* (2006.01)
(Continued)

(52) U.S. Cl.
CPC ............. *H01M 4/32* (2013.01); *H01M 4/364* (2013.01); *H01M 4/366* (2013.01); *H01M 4/38* (2013.01);
(Continued)

(58) Field of Classification Search
CPC .......... H01M 4/32; H01M 4/38; H01M 4/383; H01M 4/52; H01M 4/62; H01M 4/624;
(Continued)

(56) References Cited

U.S. PATENT DOCUMENTS 5,700,596 A 12/1997 Ikoma et al.
2002/0037455 A1* 3/2002 Tani ........................ H01M 4/30
429/223
(Continued)

FOREIGN PATENT DOCUMENTS

JP 05-041212 A 2/1993
JP H05-074450 A 3/1993
(Continued)

OTHER PUBLICATIONS

International Search Report and Written Opinion issued in corresponding International Patent Application No. PCT/JP2014/006060, dated Feb. 3, 2015; with partial English translation.

*Primary Examiner* — Karie O'Neill Apicella
(74) *Attorney, Agent, or Firm* — McDermott Will & Emery LLP

(57) ABSTRACT

A positive electrode for alkaline storage batteries that enables to improve the active material utilization rate, while suppressing the self-discharge. The positive electrode for alkaline storage batteries includes a support having conductivity, and a positive electrode active material adhering to the support. The positive electrode active material includes particles of a nickel oxide. The particles of the nickel oxide include a first particle group having a particle diameter of 20
(Continued)

μm or more, and a second particle group having a particle diameter of less than 20 μm. The first particle group includes a first component with cracks, and a second component without cracks. The proportion of the first particle group in the particles of the nickel oxide is 15 vol % or more, and the proportion by number of the first component in the first particle group is 15% or more.

11 Claims, 5 Drawing Sheets

(51) Int. Cl.
*H01M 4/52* (2010.01)
*H01M 4/62* (2006.01)
*H01M 4/36* (2006.01)
*H01M 10/30* (2006.01)
*H01M 4/66* (2006.01)
*H01M 4/02* (2006.01)

(52) U.S. Cl.
CPC ............. *H01M 4/52* (2013.01); *H01M 4/624* (2013.01); *H01M 4/661* (2013.01); *H01M 10/30* (2013.01); *H01M 4/383* (2013.01); *H01M 2004/028* (2013.01); *Y02E 60/124* (2013.01)

(58) Field of Classification Search
CPC ........ H01M 4/36; H01M 4/364; H01M 4/366; H01M 10/30
See application file for complete search history.

(56) References Cited

U.S. PATENT DOCUMENTS

| | | | |
|---|---|---|---|
| 2006/0029864 A1* | 2/2006 | Matsumoto | H01M 4/244 429/223 |
| 2007/0292758 A1 | 12/2007 | Uchida et al. | |
| 2010/0310938 A1 | 12/2010 | Okada et al. | |

FOREIGN PATENT DOCUMENTS

| | | |
|---|---|---|
| JP | H07-130365 A | 5/1995 |
| JP | 2002-249320 A | 9/2002 |
| JP | 2006-151795 A | 6/2006 |
| JP | 2009-208993 A | 9/2009 |
| JP | 2009-259798 A | 11/2009 |
| WO | 2006/046752 A1 | 5/2006 |
| WO | 2009/116284 A1 | 9/2009 |

* cited by examiner

[FIG. 1]
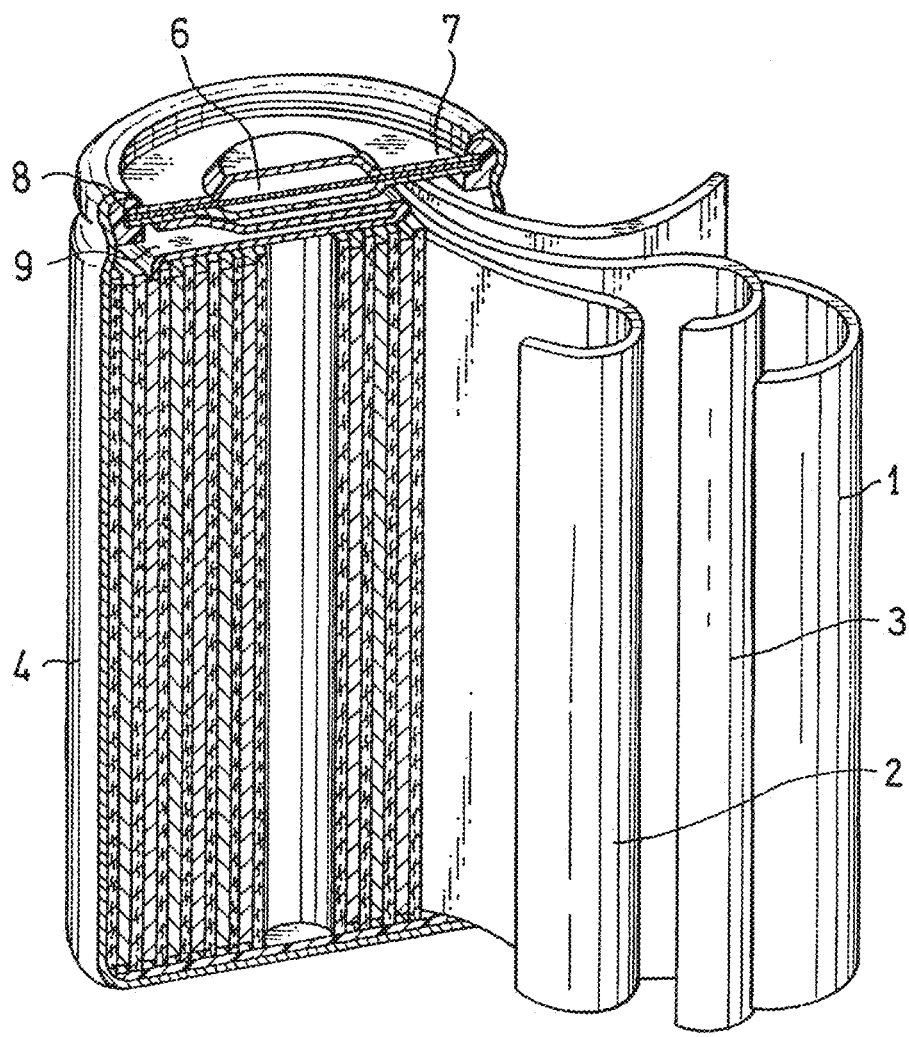

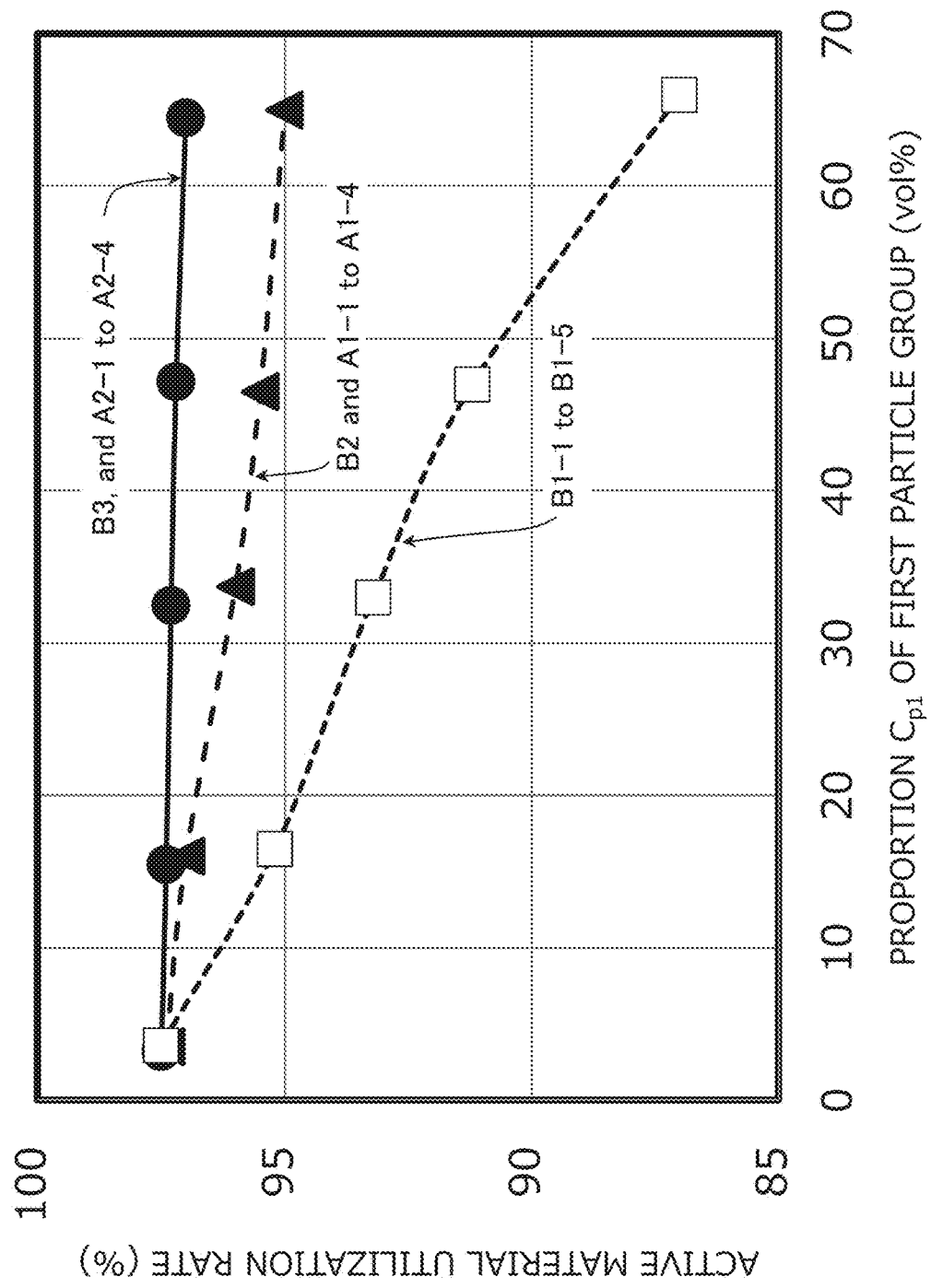
[FIG. 2]

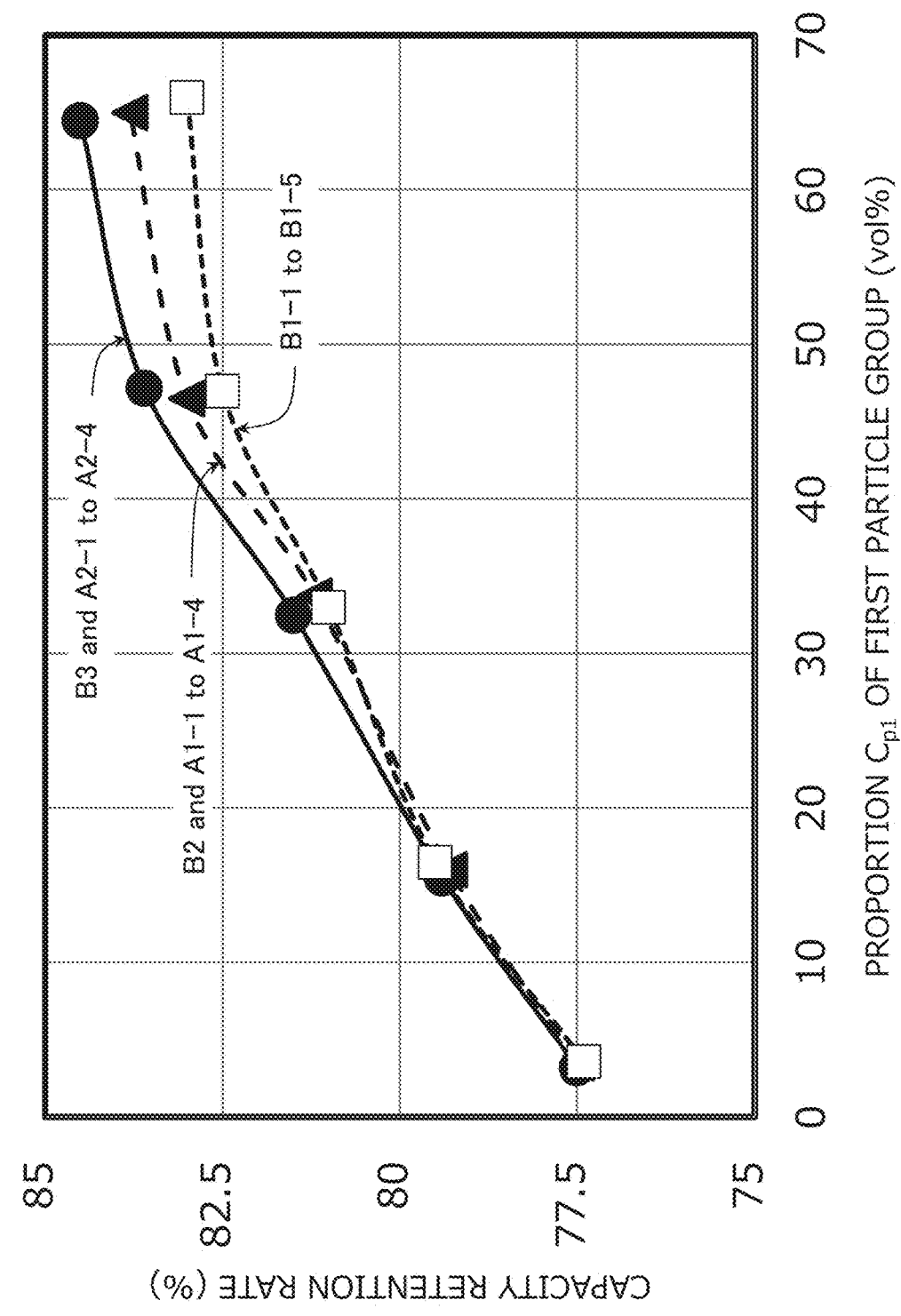
[FIG. 3]

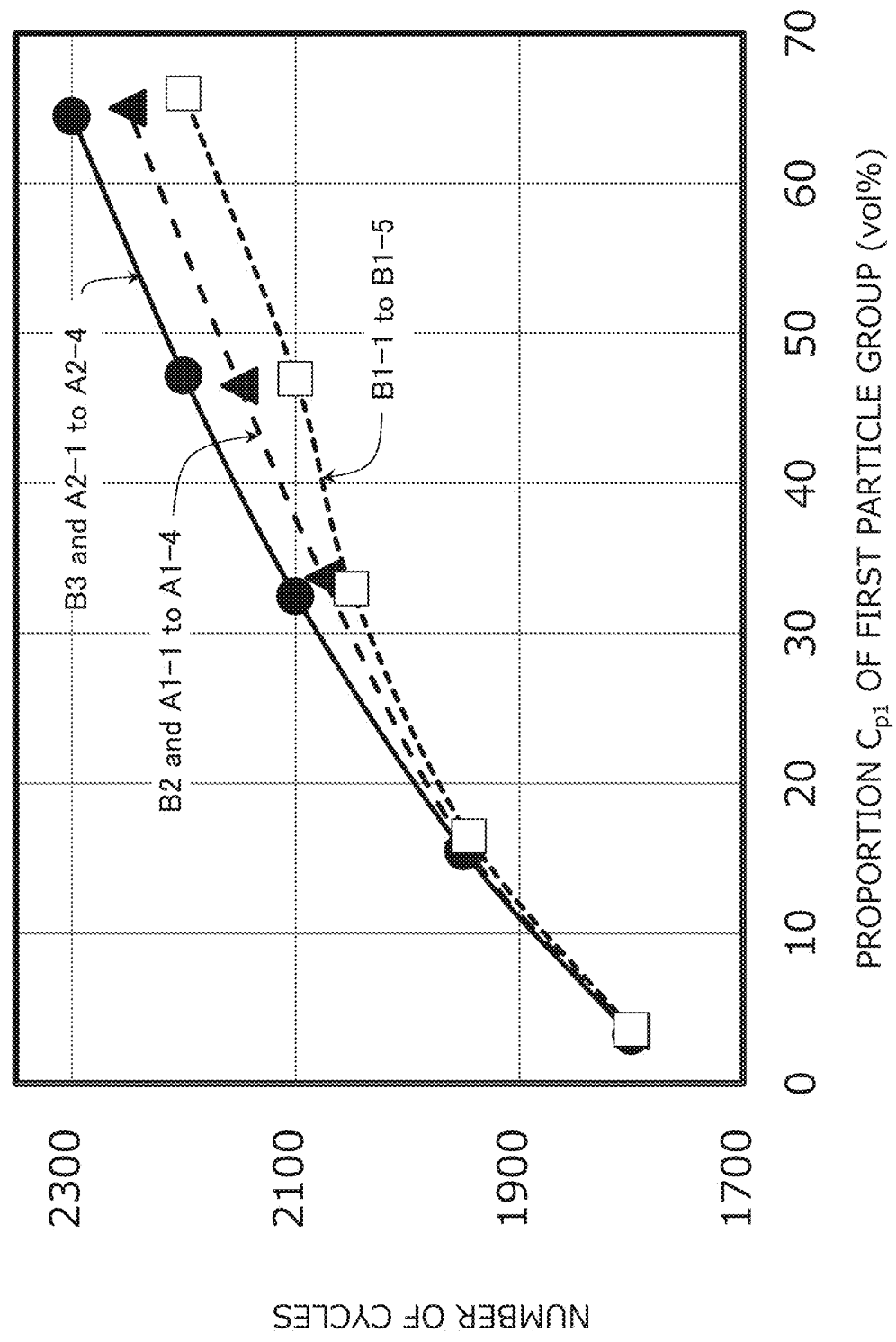
[FIG. 4]

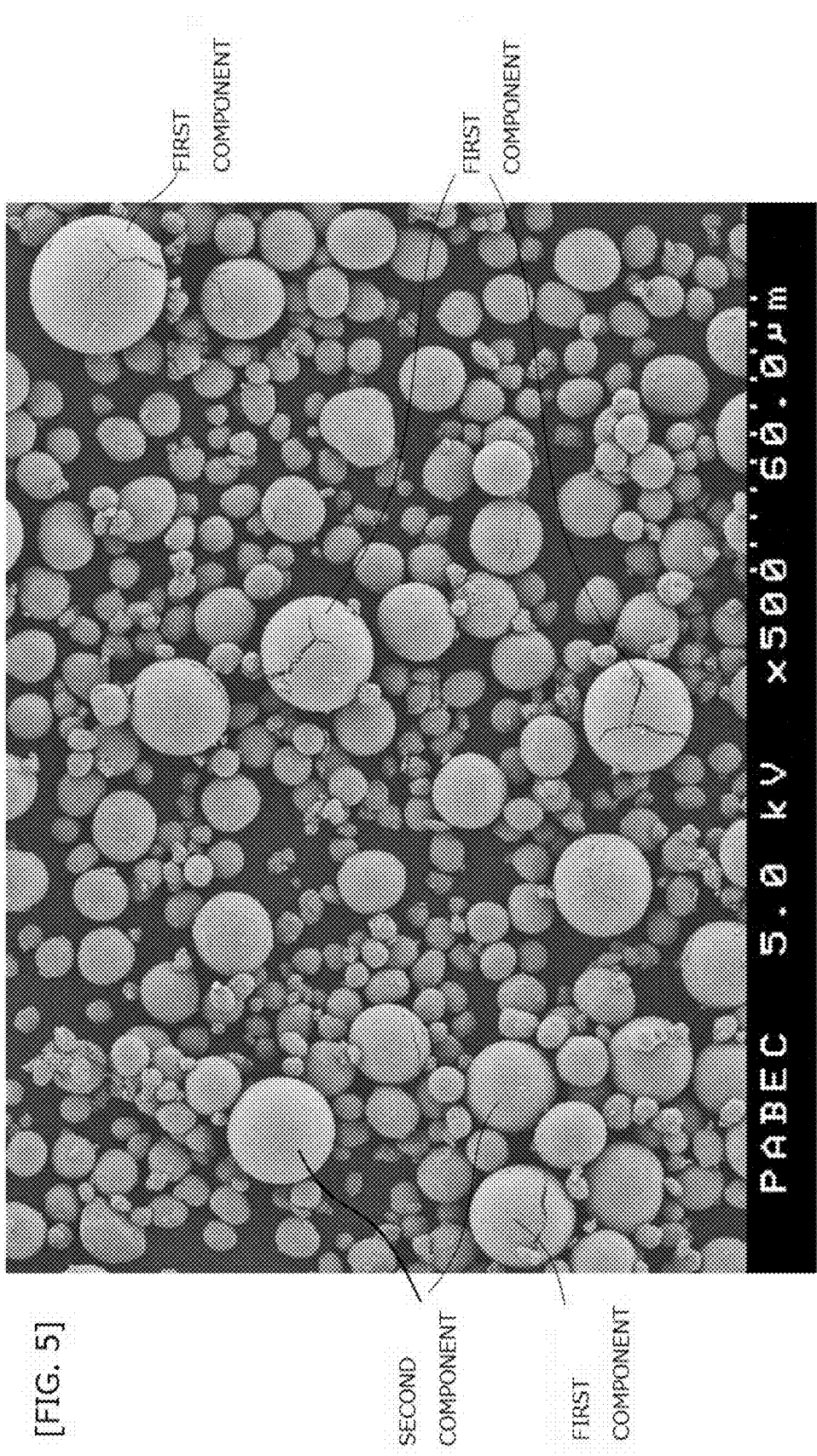
[FIG. 5]

POSITIVE ELECTRODE FOR ALKALINE STORAGE BATTERIES AND ALKALINE STORAGE BATTERY

RELATED APPLICATIONS

This application is the U.S. National Phase under 35 U.S.C. § 371 of International Patent Application No. PCT/JP2014/006060, filed on Dec. 4, 2014, which in turn claims the benefit of Japanese Application No. 2013-255194, filed on Dec. 10, 2013, the disclosures of which Applications are incorporated by reference herein.

TECHNICAL FIELD

The present invention relates to a positive electrode containing a nickel oxide for alkaline storage batteries, and an alkaline storage battery including the positive electrode.

BACKGROUND ART

Alkaline storage batteries such as nickel-cadmium storage batteries and nickel-metal hydride storage batteries have high capacity and are expected to be utilized for various applications. Particularly in recent years, also in such an application as main power source for portable electronic devices and other electronic devices, or backup power source, alkaline storage batteries have been assumed to be used. Studies have been made for utilization of alkaline storage batteries in those applications as auxiliary power source for batteries that have been charged and utilization as emergency power source in disaster areas.

In alkaline storage batteries, a nickel oxide, including nickel oxyhydroxide and nickel hydroxide, is typically used as a positive electrode active material. As shown in the formula below, during charge, the nickel hydroxide is converted to nickel oxyhydroxide; during discharge, the nickel oxyhydroxide is converted to nickel hydroxide.

Negative electrode:  $MH + OH^- \rightleftarrows M + H_2O + e^-$

Positive electrode: 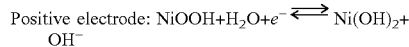 $NiOOH + H_2O + e^- \rightleftarrows Ni(OH)_2 + OH^-$ Whole reaction: 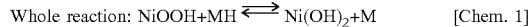 $NiOOH + MH \rightleftarrows Ni(OH)_2 + M$ [Chem. 1]

(In the formulas, M represents a hydrogen storage alloy)

In view of improving the characteristics of alkaline storage batteries, various approaches have been made. For example, Patent Literature 1 suggests that the internal pore volume of the nickel hydroxide forming an active material layer be 0.1 mL/g or less, and the particle diameter thereof be from 20 to 40 μm, in view of improving high-rate discharge characteristics.

Patent Literature 2 suggests increasing the tap density and the bulk density of the nickel hydroxide particles, in order to improve the packing density of the positive electrode. Patent Literature 3 suggests that the space volume having a pore radius of 3 nm or more of the nickel hydroxide active material be 20 to 70% of the total space volume, in view of improving the active material utilization rate in the early stage of charge and discharge.

CITATION LIST

Patent Literature

[PTL 1] Japanese Laid-Open Patent Publication No. Hei 5-74450
[PTL 2] Japanese Laid-Open Patent Publication No. 2002-249320
[PTL 3] Japanese Laid-Open Patent Publication No. Hei 5-41212

SUMMARY OF INVENTION

Technical Problem

In the application such as main power source for electronic devices or backup power source, utilization as auxiliary power source for batteries that have been charged and utilization as emergency power source in disaster areas have been studies. When an alkaline storage battery is used in those applications, since the battery is left in a charged state, the self-discharge after the battery has been charged until it is actually used is required to be small.

When the activity of the nickel oxide serving as the positive electrode active material is too high, the decomposition reaction of the nickel oxide occurs easily, increasing the self-discharge. Therefore, in order to suppress the self-discharge, it is considered effective to control the activity of the nickel oxide to some extent.

Increasing the particle diameter of the nickel oxide leads to a small specific surface area of the active material, which may be able to suppress the activity from being too high. However, increasing the particle diameter makes it difficult to utilize the nickel oxide in the interior of the particle for charge and discharge reactions, reducing the active material utilization rate.

An object of the present invention is to provide a positive electrode for alkaline storage batteries that enables to improve the active material utilization rate, while suppressing the self-discharge.

Solution to Problem

One aspect of the present invention relates to a positive electrode for alkaline storage batteries. The positive electrode includes a support having conductivity, and a positive electrode active material adhering to the support. The positive electrode active material includes particles of a nickel oxide. The particles of the nickel oxide include a first particle group having a particle diameter of 20 μm or more, and a second particle group having a particle diameter of less than 20 μm. The first particle group includes a first component with cracks, and a second component without cracks. The proportion of the first particle group in the particles of the nickel oxide is 15 vol % or more. The proportion by number of the first component in the first particle group is 15% or more.

Another aspect of the present invention relates to an alkaline storage battery including the aforementioned positive electrode, a negative electrode, a separator interposed between the positive electrode and the negative electrode, and an alkaline electrolyte.

Advantageous Effects of Invention

According to the present invention, it is possible to reduce the specific surface area of the nickel oxide, as well as to maintain the high activity of the nickel oxide. Therefore, the active material utilization rate can be improved, while the self-discharge can be suppressed, in the alkaline storage battery.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF DRAWINGS

FIG. 1 A longitudinal cross-sectional view schematically illustrating the structure of an alkaline storage battery according to one embodiment of the present invention FIG. 2 A graph showing the active material utilization rate (positive electrode utilization rate) in alkaline storage batteries of Examples and Comparative Examples FIG. 3 A graph showing the capacity retention rate in the alkaline storage batteries of Examples and Comparative Examples FIG. 4 A graph showing the number of cycles (cycle life) in the alkaline storage batteries of Examples and Comparative Examples FIG. 5 A scanning electron microscope photograph (magnification: ×500) of nickel oxide particles taken out from the positive electrode of Example 1

DESCRIPTION OF EMBODIMENTS

In the following, embodiments of the present invention will be more specifically described, with reference to drawings as appropriate.
(Positive Electrode for Alkaline Storage Batteries)

A positive electrode for alkaline storage batteries includes a support having electrical conductivity and a positive electrode active material adhering to the support. The positive electrode active material includes particles of a nickel oxide. The particles of the nickel oxide include a first particle group having a particle diameter of 20 μm or more, and a second particle group having a particle diameter of less than 20 μm. The first particle group includes a first component with cracks, and a second component without cracks. The proportion ($C_{p1}$) of the first particle group in the particles of the nickel oxide is 15 vol % or more, and the proportion by number ($C_{c1}$) of the first component in the first particle group is 15% or more.

The inclusion of the first particle group with large diameters in the nickel oxide particles in a proportion of 15 vol % or more can decrease the specific surface area of the nickel oxide particles. This can suppress the activity of the nickel oxide particles from increasing too high, and thus can suppress the decomposition reaction of the nickel oxide. As a result, the self-discharge can be suppressed.

In general, when the nickel oxide particles become larger in diameter, the electrolyte is difficult to penetrate deep into the particles, and the nickel oxide inside the particles becomes difficult to be utilized for charge and discharge reactions, reducing the active material utilization rate. However, in the present embodiment, since 15% or more of the first particle group with large particle diameters are the first component with cracks, the electrolyte is more likely to penetrate into the interior of the particles via the cracks, and the charge and discharge reactions can proceed also in the interior of the particle. Therefore, despite much inclusion of the first particle group with large diameters, the active material utilization rate can be increased.

When the charge and discharge reactions are concentrated at the surface of the nickel oxide particles, deterioration during overcharge tends to occur at the particle surface, and the cycle life tends to be shortened. However, in the present embodiment, the charge and discharge reactions can proceed not only at the surface of the nickel oxide particles but also in the interior thereof. In short, the charge and discharge reactions can proceed more uniformly in the whole nickel oxide particle, which can slow the deterioration at the particle surface during overcharge. Therefore, the cycle life also can be improved.

Here, given that the first particle group is classified into particles with cracks and particles without cracks, a group of particles with cracks are referred to as a first component, and a group of particles without cracks are referred to as a second component.

The "crack" means a fissure formed along the grain boundary between primary particles in the nickel oxide particle, rather than a wrinkle-like shallow crevice formed only on the surface of the nickel oxide particle. The depth of the crack (or fissure) is preferably 0.5 μm or more, and may be 5% or more of the particle diameter, or may be 10% or more, or 20% or more of the particle diameter. The upper limit of the depth of the crack is not particularly limited, but is preferably 50% or less of the particle diameter.

The support (or core material) having conductivity included in the positive electrode may be any known conductive support used for the positive electrode of alkaline storage batteries. The conductive support may be a three-dimensional porous material, or may be a flat plate or a sheet.

Examples of the material of the support include nickel and a nickel alloy. The support may be a nickel-plated metal support (e.g., iron support, iron-alloy support).

The positive electrode active material includes particles of a nickel oxide. The nickel oxide mainly includes nickel oxyhydroxide and/or nickel hydroxide. The positive electrode active material is mainly composed of the nickel oxide. The amount of the nickel oxide in the positive electrode active material is, for example, 90 to 100 mass %, and may be 95 to 100 mass %. The positive electrode active material may be composed of the nickel oxide only.

The particles of the nickel oxide include a first particle group having a particle diameter of 20 μm or more, and a second particle group having a particle diameter of less than 20 μm. The first particle group includes a first component with cracks, and a second component without cracks. In the first component, at least one crack suffices per particle, and there may be two or more cracks per particle. Although the crack may be formed near the surface of nickel oxide particle only, the crack is preferably formed deeper inside the particle, in view of improving the electrolyte penetration.

The proportion $C_{p1}$ of the first particle group in the particles of the nickel oxide is 15 vol % or more, and preferably 30 vol % or more. In the present embodiment, since the proportion by number $C_{c1}$ of the first component in the first particle group is 15% or more, the utilization rate is unlikely to be reduced, even though $C_{p1}$ is 45 vol % or more, or 50 vol % or more. The upper limit of $C_{p1}$ is not particularly limited, and may be 100 vol %. In view of improving the charge and discharge characteristics, $C_{p1}$ is preferably 80 vol % or less or 70 vol % or less. These lower limits and upper limits can be combined in any combination. $C_{p1}$ may be 15 to 100 vol %, 30 to 70 vol %, or 45 to 70 vol %.

When $C_{p1}$ is less than 15 vol %, since the number of particles of the first component with cracks is relatively small, the improvement in the active material utilization rate is not so evident. More specifically, the increase of the active material utilization rate is small when the proportion by number $C_{c1}$ of the first component is less than 15%, as compared to when $C_{c1}$ is 15% or more.

The proportion by number $C_{c1}$ of the first component in the first particle group is 15% or more, preferably 20% or more, or may be 35% or more, or 40% or more. The upper limit of $C_{c1}$ is not particularly limited, and may be 100%. In view of further improving the cycle life, $C_{c1}$ is preferably 60% or less or 50% or less. These lower limits and upper limits can be combined in any combination. $C_{c1}$ may be 15 to 100%, 20 to 60%, or 20 to 50%.

When $C_{c1}$ is less than 15%, due to a large proportion of the second component without cracks, the charge and discharge reactions are difficult to proceed in the interior of the nickel oxide particle, reducing the active material utilization rate. When $C_{c1}$ is less than 15%, the reduction in the active material utilization rate tends to be more severe with increase of $C_{p1}$. However, according to the present embodiment, even when $C_{p1}$ is high (e.g., 45 vol % or more, or 50 vol % or more), by setting $C_{c1}$ within the range above, the reduction in the active material utilization rate can be very effectively suppressed.

The proportion $C_{p1}$ of the first particle group can be determined, for example, from a volumetric particle size distribution obtained by laser diffraction and scattering particle size distribution analysis.

The proportion by number $C_{c1}$ of the first component can be determined based on the number of particles with cracks (first component) measured by, for example, taking a scanning electron microscope (SEM) photograph of the nickel oxide particles, and with respect to at least 100 particles chosen from the first particle group on the photograph, counting the number of the particles with cracks. To enhance the accuracy, the measurement of the number of particles may be made on several fields of view (e.g., 10 fields of view).

The average particle diameter of the particles of the nickel oxide can be selected from, for example, the range of 5 to 40 μm, and is preferably 10 to 30 μm, more preferably 13 to 19 μm. When the average particle diameter is within the range above, the active material utilization rate and the cycle life can be more effectively enhanced.

Herein, the average particle diameter means a volumetric median diameter in a particle size distribution obtained by laser diffraction and scattering particle size distribution analysis.

With respect to the individual nickel oxide particles, those having a particle size of 20 μm or more are classified as a first particle group, and those having a particle size of less than 20 μm are classified as a second particle group. The upper limit of the distribution of the particle size of the first particle group is, for example, 50 μm or less, but not limited thereto. The lower limit of the distribution of the particle size of the second particle group is, for example, 1 μm or more.

The nickel oxide can be obtained by mixing an aqueous solution of an inorganic acid salt of nickel (e.g., (sulfate) and an aqueous solution of a metal hydroxide (e.g., sodium hydroxide). Mixing of these aqueous solutions causes particles including a nickel oxide to precipitate in the mixed solution. To stabilize the metal ion such as nickel ion, for example, a complexing agent (e.g., inorganic base such as ammonia) may be added to the mixed solution and/or the aqueous solution of the inorganic acid salt of nickel. The complexing agent may be added in the form of aqueous solution.

The first component with cracks can be formed by application of a large shearing force to the particles (e.g., increasing the mixing speed) when allowing them to precipitate in the mixed solution. When the particles are grown to a large size, the stress in the particles tends to be non-uniform, which facilitates the formation of cracks. By adjusting the mixing time (or residence time) of the aqueous solution of the inorganic acid salt of nickel and the aqueous solution of the metal hydroxide, and/or adjusting the amount of the complexing agent, the diameter of the nickel oxide particles can be controlled.

The concentration of the inorganic acid salt of nickel in its aqueous solution is, for example, 1 to 5 mol/dm$^3$, and preferably 1.5 to 4 mol/dm$^3$.

The metal hydroxide may be, for example, an alkali metal hydroxide such as sodium hydroxide or potassium hydroxide. The concentration of the metal hydroxide in its aqueous solution is, for example, 2 to 12 mol/dm$^3$, preferably 3 to 10 mol/dm$^3$, and more preferably 4 to 8 mol/dm$^3$.

By adjusting the concentration of the aqueous solution of the inorganic acid salt of nickel, and/or the concentration of the aqueous solution of the metal hydroxide, the diameter of the nickel oxide particles can be controlled.

The metal hydroxide is used in such a proportion that the stoichiometry ratio of the nickel in the inorganic acid salt to the hydroxide ion capable of producing the metal hydroxide is 1:2 (molar ratio). The molar amount of the hydroxide ion is preferably slightly in excess of twice the molar amount of the nickel in the inorganic acid salt.

The temperature of the mixed solution is, for example, 30 to 65° C.

The nickel oxide may contain a first metal element incorporated in the crystal structure of the nickel oxide. Specifically, the nickel oxide may be a solid solution containing a first metal element. When the nickel oxide contains a first metal element, the charging efficiency can be further enhanced, and the positive electrode utilization rate can be more effectively improved. In particular, even at high temperatures, a high charging efficiency can be achieved. Moreover, the self-discharge during storage can be more effectively suppressed.

Examples of the first metal element include: alkaline earth metal elements, such as magnesium and calcium; and transition metal elements (e.g., Periodic Table Group 9 elements such as cobalt, Periodic Table Group 12 elements such as zinc and cadmium). These first metal elements may be used singly or in combination of two or more. Preferred among these first metal elements is magnesium, cobalt, cadmium and/or zinc.

The content of the first metal element is, for example, 0.1 to 10 parts by mass, relative to 100 parts by mass of the nickel contained in the nickel oxide.

The first metal element can be incorporated into the crystal structure of the nickel oxide by allowing the first metal element to exist when mixing the aqueous solution of the inorganic acid salt of nickel and the aqueous solution of the metal hydroxide.

The particles of the nickel oxide may have a conductive layer on their surfaces.

The conductive layer preferably includes a metal oxide such as a cobalt oxide, as a conductive agent. Examples of the metal oxide include oxides such as cobalt oxide, and oxyhydroxides such as cobalt oxyhydroxide.

The amount of the conductive agent is, for example, 2 to 10 parts by mass, preferably 3 to 7 parts by mass, and more preferably 4 to 5 parts by mass, relative to 100 parts by mass of the nickel oxide.

The conductive layer can be formed by any known method, depending on the type of the conductive agent. For example, a conductive layer including a metal oxide such as a cobalt oxide can be formed by, (a) allowing a metal hydroxide such as cobalt hydroxide to adhere to the surface of the nickel oxide-containing particles, and (b) converting the metal hydroxide to a metal oxide such as γ-cobalt oxyhydroxide by heat treatment in the presence of an alkali metal hydroxide.

In the cracks in the first component, the conductive agent forming the conductive layer may or may not have entered. In many of the cracks formed before the formation of the conductive layer, for example, formed during the growth of nickel oxide particles, the conductive agent has entered. In the cracks formed after the formation of the conductive layer, specifically, formed during the compression of the positive electrode, the conductive agent has not entered. In the present embodiment, the nickel oxide particles having a conductive layer include those in which the conductive agent forming the conductive layer has not entered the cracks in the first component.

The positive electrode can be obtained by allowing a positive electrode active material to adhere to a support. The positive electrode may be formed by allowing a positive electrode material mixture including a positive electrode active material to adhere to a support. The positive electrode active material is typically a paste (positive electrode paste) including a positive electrode active material and a dispersion medium. Depending on the shape etc. of the support, the positive electrode paste may be applied onto the support, or packed in the pores of the support. Examples of the dispersion medium include water, an organic medium, or a mixed medium obtained by mixing two or more selected from these.

The positive electrode paste or material mixture may include, as appropriate, any known conductive agent, binder, and/or thickener. The positive electrode material mixture is mainly composed of a nickel oxide. The amount of the nickel oxide in the positive electrode material mixture is, for example, 90 mass % or more, and preferably 95 mass % or more.

The positive electrode can be typically formed by applying or packing a positive electrode paste onto or into a support, followed by drying to remove the dispersion medium, and then compressing the obtained dry substance in its thickness direction (e.g., rolled between a pair of rolls). The cracks in the first component can be formed by adjusting the pressure applied when compressing the dry substance. By increasing the pressure, the proportion $C_{c1}$ of the first component can be easily increased. When a large pressure is applied by the compression to the nickel oxide particles, cracks easily occur in the large-diameter particles of the first particle group, and the active material utilization rate can be easily increased.

The positive electrode (or positive electrode material mixture) may include a positive electrode active material and a metal compound in a mixed state. By using such a positive electrode, the charging efficiency can be further enhanced, and the active material utilization rate can be further improved. In particular, even at high temperatures, the charging efficiency can be significantly improved. Moreover, the self-discharge during storage can be more effectively suppressed.

The metal compound differs from the positive electrode active material, and contains, for example, at least one metal element (second metal element) selected from the group consisting of alkali earth metals (e.g., berylium, calcium, barium), Periodic Table Group 3 metals (e.g., scandium, yttrium, lanthanoids), Group 4 metals (e.g., titanium, zirconium), Group 5 metals (e.g., vanadium, niobium), Group 6 metals (e.g., chrome, tangsten), Group 12 metals (e.g., zinc), Group 13 metals (e.g., indium), and Group 15 metals (e.g., antimony). Examples of lanthanoids include erbium, thulium, ytterbium, and lutetium. The second metal element may include one or two or more (e.g., two to four) of these metal elements.

Preferred among these second metal elements are berylium, calcium, barium, scandium, yttrium, erbium, thulium, ytterbium, lutetium, titanium, zirconium, vanadium, niobium, tungsten, zinc, indium, and/or antimony. Particularly preferred among them are calcium, yttrium, ytterbium, titanium, tungsten, and/or zinc. In another preferable case, the second metal element includes ytterbium, titanium, tungsten, and zinc.

Examples of the metal compound containing the second metal element include oxides, hydroxides, fluorides, and inorganic acid salts (e.g., sulfate). These metal compounds may be used singly or in combination of two or more. Preferred among them are, for example, oxides, hydroxides, and fluorides.

Specific examples of the metal compound containing the second metal element include: oxides, such as BeO, $Sc_2O_3$, $Y_2O_3$, $Er_2O_3$, $Tm_2O_3$, $Yb_2O_3$, $Lu_2O_3$, $TiO_2$, $ZrO_2$, $V_2O_5$, $Nb_2O_5$, $WO_3$, $ZnO$, $In_2O_3$, and $Sb_2O_3$; and hydroxides, such as $Ca(OH)_2$, and $Ba(OH)_2$; and fluorides, such as $CaF_2$.

The amount of the metal compound is, for example, 0.1 to 5 parts by mass, relative to 100 parts by mass of the nickel oxide serving as the positive electrode active material.

When using two or more metal compounds, it is preferable to adjust the amount of each metal compound such that the total amount of the compounds falls within the above range. Two or more metal compounds may be used in such a proportion that they are contained in substantially equal amounts.

(Alkaline Storage Battery)

An alkaline storage battery includes the aforementioned positive electrode, a negative electrode, a separator interposed between the positive electrode and the negative electrode, and an alkaline electrolyte.

The configuration of the alkaline storage battery will be described below with reference to FIG. 1. FIG. 1 is a longitudinal cross-sectional view schematically illustrating the structure of an alkaline storage battery according to one embodiment of the present invention. The alkaline storage battery includes a bottom-closed cylindrical battery case 4 serving as a negative terminal, an electrode group housed in the battery case 4, and an alkaline electrolyte (not shown). The electrode group includes a negative electrode 1, a positive electrode 2, and a separator 3 interposed therebetween, which are spirally wound together. A sealing plate 7 provided with a safety valve 6 is placed at the opening of the battery case 4, with an insulating gasket 8 interposed therebetween. The edge of the opening of the battery case 4 is crimped inward, thereby the alkaline storage battery is sealed. The sealing plate 7, which serves as a positive terminal, is electrically connected to the positive electrode 2 via a positive electrode current collector 9.

The alkaline storage battery can be obtained by placing the electrode group in the battery case 4, injecting an alkaline electrolyte, disposing the sealing plate 7 at the opening of the battery case 4 with the insulating gasket 8 interposed therebetween, and crimping the edge of the opening of the battery case 4 to seal the battery. The negative electrode 1 of the electrode group is, at its outermost layer, in contact with the battery case 4, and electrically connected thereto. The positive electrode 2 of the electrode group and the sealing plate 7 are electrically connected to each other via the positive electrode current collector 9.

Examples of the alkaline storage battery include nickel-metal hydride storage batteries, nickel-cadmium storage batteries, and nickel-zinc storage batteries. According to the present embodiment, the self-discharge can be significantly suppressed. Therefore, suitable application includes nickel-metal hydride batteries which show high self-discharge.

The components other than the positive electrode of the alkaline storage battery will be more specifically described below.

(Negative Electrode)

Any negative electrode can be used depending on the type of the alkaline storage battery. In a nickel-metal hydride storage battery, for example, a negative electrode including, as a negative electrode active material, a hydrogen storage alloy powder capable of electrochemically absorbing and releasing hydrogen can be used. In a nickel-cadmium storage battery, for example, a negative electrode including, as a negative electrode active material, a cadmium compound such as cadmium hydroxide can be used.

The negative electrode may include a support (or core material) and a negative electrode active material adhering to the support.

The support may be any known one, for example, a porous or non-porous substrate made of stainless steel, nickel or an alloy thereof. When the support is a porous substrate, the active material may be packed in the pores of the support.

The negative electrode can be formed by allowing a negative electrode material mixture including at least a negative electrode active material to adhere to the support. The negative electrode active material mixture is typically used in a form of a paste including a dispersion medium. More specifically, similarly to the positive electrode, the negative electrode can be formed by applying or packing the negative electrode material mixture paste onto or into the support, followed by drying to remove the dispersion medium, and then by compressing in the thickness direction. The dispersion medium can be selected as appropriate from those exemplified for the positive electrode.

The negative electrode material mixture may include, as appropriate, any known components used for the negative electrode, for example, a conductive agent, binder, or thickener.

The conductive agent may be any material with electron conductivity. Examples of such material include: graphite, such as natural graphite (e.g., flake graphite), artificial graphite and expandable graphite; carbon black, such as acetylene black and Ketjen black; conductive fibers, such as carbon fibers and metal fibers; metal particles, such as copper powder; and organic conductive materials, such as polyphenylene derivatives. These conductive agents may be used singly or in combination of two or more. Preferred among them are artificial graphite, Ketjen black, and carbon fibers.

The amount of the conductive agent is, for example, 0.01 to 20 parts by mass, and preferably 0.1 to 10 parts by mass, relative to 100 parts by mass of the active material.

The conductive agent may be added to the negative electrode material mixture paste, and used as a mixture with other components. The conductive agent may be applied in advance as a coating onto the negative electrode active material particle. The conductive agent can be applied as a coating by any known method, for example, by sprinkling the conductive agent onto the surface of the negative electrode active material particle, by allowing a dispersion containing the conductive agent to adhere to the surface and drying, and/or by mechanical coating such as mechano-chemical method.

The binder is preferably a resin material, examples of which include: rubbery materials, such as styrene-butadiene copolymer rubber; polyolefin resins, such as polyethylene and polypropylene; fluorocarbon resins, such as polyvinylidene fluoride; and acrylic resins and Na ion cross-linked products thereof, such as ethylene-acrylic acid copolymer and ethylene-methyl acrylate copolymer. These binders may be used singly or in combination of two or more.

The amount of the binder is, for example, 7 parts by mass or less, and may be 0.01 to 5 parts by mass, relative to 100 parts by mass of the negative electrode active material.

Examples of the thickener include: cellulose derivatives, such as carboxymethyl cellulose and modified products thereof (including salts such as Na salts), and methyl cellulose; saponificated products of polymers having vinyl acetate units, such as polyvinyl alcohol; and polyalkylene oxides, such as polyethylene oxide. These thickeners may be used singly or in combination of two or more.

The amount of the thickener is, for example, 5 parts by mass or less, and may be 0.01 to 3 parts by mass, relative to 100 parts by mass of the active material.

(Alkaline Electrolyte)

The alkaline electrolyte can be, for example, an aqueous solution containing an alkaline solute. Examples of the alkaline solute include alkaline metal hydroxides such as lithium hydroxide, potassium hydroxide, and sodium hydroxide. These may be used singly or in combination of two or more.

The concentration of the solute (specifically, the alkaline metal hydroxide) in the alkaline electrolyte is, for example, 2.5 to 13 mol/dm$^3$, and preferably 3 to 12 mol/dm$^3$.

The alkaline electrolyte preferably includes at least sodium hydroxide. Sodium hydroxide may be used in combination with lithium hydroxide and/or potassium hydroxide. The alkaline electrolyte may include sodium hydroxide only, as the solute.

The concentration of sodium hydroxide in the alkaline electrolyte is, for example, 2.5 to 11.5 mol/dm$^3$, preferably 3.5 to 10.5 mol/dm$^3$, and more preferably 4 to 10 mol/dm$^3$. When the concentration of sodium hydroxide is within such a range (in particular, high concentration), the charging efficiency can be more effectively increased even at high temperatures, and the self-discharge can be more effectively suppressed. Furthermore, while keeping the high charging efficiency, it is possible to suppress the drop in discharge average voltage, thereby to improve the cycle life.

(Others)

The separator may be any one commonly used in alkaline storage batteries, for example, a microporous film, a non-woven fabric, or a laminate thereof. Examples of the materials of microporous film and non-woven fabric include: polyolefin resins, such as polyethylene and polypropylene; fluorocarbon resins; and polyamide resins. Preferred is a separator made of polyolefin resin, because it is highly resistant to decomposition in the presence of alkaline electrolyte.

Into the separator made of a highly hydrophobic material such as polyolefin resin, it is preferable to introduce a hydrophilic group in advance by hydrophilic treatment. Examples of the hydrophilic treatment include corona discharge treatment, plasma treatment, and sulfonation treatment. Particularly preferred is a separator subjected to sulfonation treatment, i.e., a separator (e.g., a polyolefin resin separator) having a sulfonic acid group.

As for the battery case and other component elements, those commonly used for alkaline storage batteries can be used.

EXAMPLES

The present invention will now be specifically described with reference to Examples and Comparative Examples. The present invention, however, should not be construed as limited to the following examples.

Comparative Example 1

(1) Production of Positive Electrode
(a) Preparation of Nickel Oxide Particles

An aqueous solution containing nickel sulfate at a concentration of 2.5 mol/dm$^3$, an aqueous solution containing sodium hydroxide at a concentration of 5.5 mol/dm$^3$, and an aqueous solution containing ammonia at a concentration of 5.0 mol/dm$^3$ were supplied in a mass ratio of 1:1:1 at a predetermined supply rate into a reactor vessel and mixed, to allow a nickel oxide mainly containing nickel hydroxide to precipitate. The temperature of the mixed solution at this time was 50° C.

The mixed solution containing the precipitated nickel oxide was allowed to overflow into another vessel. To the collected mixed solution, an aqueous sodium hydroxide solution was added to wash the nickel oxide, followed by washing with water. The washing with water was followed by removal of water and drying, thereby nickel oxide particles were obtained.

The obtained nickel oxide particles were added to an aqueous cobalt sulfate solution (concentration: 2.5 mol/dm$^3$) to give a mixture. The mixture, an aqueous ammonia solution (concentration: 5.0 mol/dm$^3$), and an aqueous sodium hydroxide solution (concentration: 5.5 mol/dm$^3$) were supplied into a reactor vessel, each at a predetermined supply rate, and mixed while stirred. In that way, cobalt hydroxide was deposited on the surface of the nickel oxide particles, to form a coating layer containing cobalt hydroxide.

The nickel oxide particles with the coating layer formed thereon was collected, and heated at 90 to 130° C. in the presence of a high-concentration (40 mass % or more) aqueous solution of sodium hydroxide, while air (oxygen) was supplied thereto. Thereby the cobalt hydroxide was converted to an electrically conductive cobalt oxide, and nickel oxide particles (b1-1, average particle diameter: approx. 10 μm) having a conductive layer of cobalt oxide on their surfaces were obtained.

Nickel oxide particles (b1-2, average particle diameter: approx. 13 μm) were produced in the same manner as the particles b1-1, except that the concentration of the aqueous sodium hydroxide solution was changed to 6 mol/dm$^3$. Similarly, particles b1-3 to b1-5 were produced in the same manner as the particles b1-1, except that the concentration of the aqueous sodium hydroxide solution was changed.

(b) Production of Positive Electrode

The nickel oxide particles obtained in (a) above were mixed with a predetermined amount of water, to prepare a positive electrode paste.

The positive electrode paste was packed into a porous nickel foam (porosity: 95%, plane density: 300 g/cm$^2$) serving as a core material, and dried. The dry substance was compressed in its thickness direction, and cut in a predetermined size (thickness: 0.5 mm, length: 110 mm, width: 35 mm), thereby to produce a positive electrode (positive electrodes B1-1 to B1-5). The amount of the positive electrode paste to be packed was adjusted such that, given that the nickel oxide performs one-electron reaction during charge and discharge, the positive electrode had a theoretical capacity of 1000 mAh. At one end of the positive electrode along its longitudinal direction, the core material was exposed as a core material-exposed portion, to which one end of a positive lead was welded.

(2) Production of Negative Electrode

First, 100 parts by mass of MmNi$_{3.6}$Co$_{0.7}$Mn$_{0.4}$Al$_{0.3}$ serving as a hydrogen storage alloy, 0.15 parts by mass of carboxymethyl cellulose serving as a thickener, 0.3 parts by mass of carbon black serving as a conductive agent, and 0.7 parts by mass of styrene-butadiene copolymer serving as a binder were mixed together. Water was added to the resultant mixture and further mixed, to prepare a negative electrode material mixture paste.

The negative electrode material mixture paste was applied onto both faces of a nickel-plated iron punching metal (thickness: 30 μm) serving as a core material, to form an applied film on each face. The applied films were dried and pressed together with the core material, and cut in a predetermined size (thickness: 0.3 mm, length: 134 mm, width: 36 mm), thereby to produce a hydrogen storage alloy negative electrode. The capacity of the negative electrode was adjusted to 1600 mAh.

(3) Fabrication of Alkaline Storage Battery

Nickel-metal hydride storage batteries as illustrated in FIG. 1 were fabricated using the positive electrodes obtained in (1) and the negative electrode obtained in (2).

First, a positive electrode 2 and a negative electrode 1 were stacked with a separator 3 interposed therebetween, and they were wound spirally, to form an electrode group. The separator 3 used here was a sulfonated separator made of polypropylene.

The other end of the positive lead welded to the positive electrode 2 was welded to a positive electrode current collector 9 electrically connected to a sealing plate 7. The electrode group was placed in a bottom-closed cylindrical battery case 4, such that the outermost layer of the negative electrode 3 was brought into contact with the inner wall of the battery case 4, thereby to electrically connect them to each other.

The side wall near the opening of the battery case 4 was circumferentially recessed into a groove, and 2.0 cm$^3$ of alkaline electrolyte was injected into the battery case 4. The alkaline electrolyte used here was an aqueous sodium hydroxide solution with 7.0 mol/dm$^3$ concentration.

Next, the sealing plate 7, serving as a positive terminal and provided with a safety valve 6, was placed at the opening of the battery case 4, with an insulating gasket 8 interposed therebetween. The edge of the opening of the battery case 4 was crimped toward the gasket 8, to seal the battery case 4. In that way, AA-size alkaline storage batteries (sealed nickel-metal hydride storage batteries) B1-1 to B1-5 having a theoretical capacity of 1000 mAh, in which the battery capacity was limited by the positive electrode, were fabricated. The alkaline storage batteries were subjected to evaluation (4) after activated by charge and discharge (temperature: 20° C., conditions of charge: for 16 hours at 100 mA, conditions of discharge: for 5 hours at 200 mA).

(4) Evaluation

The following evaluation was carried out, using the nickel oxide particles and the positive electrodes obtained in (1) above or the nickel-metal hydride storage batteries obtained in (3).

(a) Measurement of Particle Size Distribution

The particle size distribution of nickel oxide particles were measured using a laser diffraction/scattering particle size distribution analyzer (available from HORIBA Ltd., LA-920) under the following conditions.

Dispersion medium: Ion-exchanged water
First dispersion: No
Circulation bath: Built-in ultrasonic wave 3 mins, Circulation speed (dial on indicator): 15
Relative refractive index (complex refractive index): 1.70 to 0.00i The measured particle size distribution was used to determine an average particle diameter of the nickel oxide particles and a proportion $C_{p1}$ (vol %) of the first particle group having a particle diameter of 20 μm or more.

(b) Proportion by Number of the First Component

The active material was collected by scraping from the positive electrode obtained in (1) above and spread over a mount, and SEM photograph (magnification: ×500) thereof was taken at least at 10 fields of view.

In the SEM photographs, with respect to 100 particles chosen from the first particle group, the number of the particles with cracks (first component) was counted, to determine a proportion $C_{c1}$ (%) by number of the first component to 100 particles of the first particle group.

(c) Evaluation of Active Material Utilization Rate

The alkaline storage battery was subjected to a charge/discharge test as below to determine an active material utilization rate of the nickel oxide serving as the positive electrode active material (positive electrode utilization rate).

The alkaline storage battery was charged at an ambient temperature of 20° C. for 16 hours at a charge rate of 0.1 It, then left to stand for 1 hour at an ambient temperature of 20° C., and after that, discharged at an ambient temperature of 20° C. at a discharge rate of 0.2 It until the battery voltage dropped to 1.0 V. This charge and discharge cycle was repeated twice in total, and a discharge capacity at the $2^{nd}$ cycle was determined. The determined discharge capacity was substituted into the following equation to calculate a positive electrode utilization rate.

Positive electrode utilization rate (%)=Discharge capacity (mAh)/1000 (mAh)×100

(d) Evaluation of Self-Discharge

The alkaline storage battery was charged at 20° C. for 16 hours at a charge rate of 0.1 It. The charged alkaline storage battery was stored at an ambient temperature of 45° C. for 1 month. The alkaline storage battery before and after the storage was discharged at 20° C. at a discharge rate of 0.2 It until the battery voltage dropped to 1.0 V, to determine a discharge capacity (mAh).

The determined discharge capacity was substituted into the following equation to calculate a capacity retention rate of the alkaline storage battery after the storage. Here, a higher capacity retention rate means a smaller self-discharge.

Capacity retention rate (%)=(Discharge capacity after storage) (mAh)/(Discharge capacity before storage) (mAh)×100

(e) Evaluation of Cycle Life

The alkaline storage battery was charged at an ambient temperature of 20° C. at a charge rate of 0.1 It for 16 hours, and then discharged at an ambient temperature of 20° C. at a discharge rate of 0.2 It until the battery voltage dropped to 1.0 V. Such charge and discharge cycle was repeated, and the number of cycles at which the discharge capacity reached 60% of the initial capacity was evaluated as the indicator of cycle life.

Examples 1 and 2 and Comparative Examples 2 and 3

Positive electrodes A1-1 to A1-4 and B2 were produced in the same manner as in Comparative Example 1, except that the pressure applied to compress the dry substance was increased to 1.1 times as high as that in Comparative Example 1. Positive electrodes A2-1 to A2-4 and B3 were produced in the same manner as in Comparative Example 1, except that the pressure applied to compress the dry substance was increased to 1.2 times as high as that in Comparative Example 1.

Alkaline storage batteries were fabricated and evaluated in the same manner as in Comparative Example 1, except for using the obtained positive electrodes.

The results of Examples and Comparative Examples are summarized in Table 1 and FIGS. 2 to 4.

TABLE 1

|  |  | Average diameter (μm) | First particle group | |
|---|---|---|---|---|
|  |  |  | Proportion $C_{p1}$ (vol %) | Proportion $C_{c1}$ of first component (%) |
| Com. Ex. 1 | B1-1 | 10.3 | 3.6 | 5.1 |
|  | B1-2 | 13.2 | 16.5 | 5.0 |
|  | B1-3 | 16.0 | 33.0 | 5.2 |
|  | B1-4 | 19.0 | 47.0 | 5.4 |
|  | B1-5 | 22.0 | 66.0 | 6.1 |
| Com. Ex. 2 | B2 | 10.4 | 3.5 | 25.3 |
| Ex. 1 | A1-1 | 13.0 | 16.0 | 26.1 |
|  | A1-2 | 16.1 | 33.7 | 24.6 |
|  | A1-3 | 18.9 | 46.5 | 22.7 |
|  | A1-4 | 21.5 | 65.0 | 23.2 |
| Com. Ex. 3 | B3 | 10.5 | 3.2 | 42.2 |
| Ex. 2 | A2-1 | 13.1 | 15.5 | 41.5 |
|  | A2-2 | 15.9 | 32.5 | 43.5 |
|  | A2-3 | 19.1 | 47.2 | 42.6 |
|  | A2-4 | 21.4 | 64.5 | 43.2 |

FIG. 2 is a graph showing the active material utilization rate (positive electrode utilization rate) in alkaline storage batteries of Examples and Comparative Examples. As shown in FIG. 2, when using the Comparative Example positive electrodes B1-1 to B1-5 in which the proportion $C_{c1}$ of the first component was less than 15%, the active material utilization rate was significantly decreased as the proportion $C_{p1}$ of the first particle group was increased. In contrast, in the Example positive electrode in which the proportion $C_{c1}$ was 15% or more, the decrease in active material utilization rate was significantly suppressed even when the proportion $C_{p1}$ of the first particle group was high. When the proportion $C_{p1}$ of the first particle group was increased to 15 vol % or more, the active material utilization rate in Comparative Example exceeded those in Examples.

FIG. 3 is a graph showing the capacity retention rate in the alkaline storage batteries of Examples and Comparative Examples. FIG. 4 is a graph showing the number of cycles (cycle life) in the alkaline storage batteries of Examples and Comparative Examples.

FIG. 3 shows that the capacity retention rate was high in Examples, as compared to Comparative Examples, indicating that the self-discharge was suppressed in Examples. FIG. 4 shows that the cycle life was improved in Examples, as compared to Comparative Examples.

FIG. 5 is a SEM photograph (magnification: ×500) of nickel oxide particles taken out from the positive electrode of Example 1. FIG. 5 shows that the first particle group having a particle diameter of 20 μm or more is approximately spherical in shape, and includes the first component with cracks and the second component without cracks. Although the second particle group with a particle diameter of less than 20 μm also includes particles with cracks, the proportion thereof in the second particle group was smaller than that of the first component in the first particle group. This indicates that the larger the particle diameter is, the more easily the cracks are formed.

Although nickel oxide particles with a cobalt oxide-containing conductive layer formed on their surfaces were used as the positive electrode active material in the above Examples, similar or analogous effects to the above were obtained when a nickel oxide without the conductive layer was used.

Similar or analogous effects to the above were obtained when a nickel oxide with cobalt, zinc, cadmium and/or magnesium incorporated in its crystal structure was used as the positive electrode active material. Here, a nickel oxide with those element incorporated in its crystal structure can be obtained by using a sulfate in which part of nickel sulfate was replaced with those elements.

Similar or analogous effects to the above were obtained when a metal compound containing berylium, calcium, barium, scandium, yttrium, erbium, thulium, ytterbium, lutetium, titanium, zirconium, vanadium, niobium, tungsten, zinc, indium, and/or antimony was added to the positive electrode paste.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

INDUSTRIAL APPLICABILITY

In a positive electrode for alkaline storage batteries and an alkaline storage battery according to the present embodiment, the active material utilization rate can be improved, while the self-discharge can be suppressed. Furthermore, the cycle life of the alkaline storage battery can be improved. Therefore, the positive electrode for alkaline storage batteries and the alkaline storage battery can be usefully used as power source for various electronic devices, transportation equipment, electricity accumulators, and others, and/or as auxiliary power source or emergency power source.

REFERENCE SIGNS LIST

1: Negative electrode, 2: Positive electrode, 3: Separator, 4: Battery case, 6: Safety valve, 7: Sealing plate, 8: Insulating gasket, 9: Positive electrode current collector

The invention claimed is:

1. A positive electrode for alkaline storage batteries, comprising:
a support having conductivity; and
a positive electrode active material adhering to the support,
the positive electrode active material including particles of a nickel oxide,
the particles of the nickel oxide including a first particle group having a particle diameter of 20 μm or more, and a second particle group having a particle diameter of less than 20 μm,
the first particle group including a group of particles with cracks, as a first component, and a group of particles without cracks, as a second component,
a proportion of the first particle group in the particles of the nickel oxide being 15 vol % or more, and
a proportion by number of the first component in the first particle group being 15% or more.

2. The positive electrode for alkaline storage batteries of claim 1, wherein the proportion by number of the first component in the first particle group is 20 to 60%.

3. The positive electrode for alkaline storage batteries of claim 1, wherein the proportion of the first particle group in the particles of the nickel oxide is 30 to 70 vol %.

4. The positive electrode for alkaline storage batteries of claim 1, wherein
the particles of the nickel oxide contain a first metal element incorporated in a crystal structure of the nickel oxide, and
the first metal element is at least one selected from the group consisting of magnesium, cobalt, cadmium, and zinc.

5. The positive electrode for alkaline storage batteries of claim 1, wherein the particles of the nickel oxide have a conductive layer on surfaces of the particles, the conductive layer including a cobalt oxide.

6. The positive electrode for alkaline storage batteries of claim 1, wherein
a mixture including the positive electrode active material and a metal compound is included, and
the metal compound contains at least one second metal element selected from the group consisting of berylium, calcium, barium, scandium, yttrium, erbium, thulium, ytterbium, lutetium, titanium, zirconium, vanadium, niobium, tungsten, zinc, indium, and antimony.

7. The positive electrode for alkaline storage batteries of claim 6, wherein the second metal element is at least one selected from the group consisting of calcium, yttrium, ytterbium, titanium, tungsten, and zinc.

8. The positive electrode for alkaline storage batteries of claim 6, wherein the second metal element includes ytterbium, titanium, tungsten, and zinc.

9. An alkaline storage battery, comprising the positive electrode of claim 1, a negative electrode, a separator interposed between the positive electrode and the negative electrode, and an alkaline electrolyte.

10. The alkaline storage battery of claim 9 being a nickel-metal hydride storage battery, wherein the negative electrode includes a hydrogen storage alloy powder that is capable of electrochemically absorbing and releasing hydrogen.

11. The alkaline storage battery of claim 9, wherein
the alkaline electrolyte is an aqueous alkaline solution containing at least sodium hydroxide as an alkali, and
a concentration of the sodium hydroxide in the alkaline electrolyte is 4 to 10 mol/dm$^3$.

* * * * *